United States Patent [19]
Kauffman

[11] Patent Number: 4,926,995
[45] Date of Patent: May 22, 1990

[54] SEPARABLE ROLLER SLEEVE

[75] Inventor: Kenneth A. Kauffman, York, Pa.

[73] Assignee: KRB Machinery Co., York, Pa.

[21] Appl. No.: 249,106

[22] Filed: Sep. 26, 1988

[51] Int. Cl.$^5$ .............................................. B65G 13/00
[52] U.S. Cl. ..................................... 193/37; 198/780
[58] Field of Search .................... 29/110, 116.1, 121.1,
29/120, 121.3–121.6, 124, 127, 128, 428, 434,
439, 446; 198/780, 781; 193/35 R, 35 F, 37;
74/551.9; 138/150, 151, 154; 285/417, 418, 419

[56] References Cited

U.S. PATENT DOCUMENTS

| | | | |
|---|---|---|---|
| 3,086,556 | 4/1963 | Kanter | 138/150 |
| 3,086,558 | 4/1963 | MacGill et al. | 138/150 |
| 3,117,371 | 1/1964 | Farley | 174/136 |
| 3,762,982 | 10/1973 | Whittington | 174/136 X |
| 4,205,105 | 5/1980 | Blundell | 138/151 X |
| 4,264,005 | 4/1981 | Smock | 198/781 |
| 4,266,660 | 5/1981 | Herman | 198/781 |
| 4,312,444 | 1/1982 | Mushovic . | |
| 4,437,495 | 3/1984 | Zonsveld | 138/150 X |
| 4,535,526 | 8/1985 | Zerfass et al. | 138/151 X |
| 4,646,677 | 3/1987 | Lounsbury, Jr. et al. | 118/653 |

FOREIGN PATENT DOCUMENTS

| | | | |
|---|---|---|---|
| 0102713 | 6/1984 | Japan | 193/37 |
| 1427744 | 2/1976 | United Kingdom | 174/136 |

Primary Examiner—David A. Bucci
Assistant Examiner—D. Glenn Dayoan
Attorney, Agent, or Firm—Samuel M. Learned, Jr.

[57] ABSTRACT

A separable roller sleeve, and methods of making and installing the same, to be provided as original equipment or alternately provide either a roller conveyor retrofit or replacement roller sleeve installation capability for both powered and idler rollers on the input and output sides of a typical roll conveying machine generally of that type employed in a shear line to accomplish movement of reinforcing rods to and from a cutting station, where the separable roller sleeve is fabricated either in the form of or from a section of resilient thick walled tubular material having an inside diameter slightly larger than that of the outside diameter of the roller to which it is to be installed and cut to the roller length, which tubular material member is then converted to a separable roller sleeve by providing therethrough a longitudinally extending compression closing spiral wall separation from one end thereof to the other whereby the spirally separable roller sleeve thus formed may then be twistably opened manually and thereby oriented and enclosably installed upon the bare conveyor roller to be covered, and upon manual release being retained upon the roller in protective operational disposition by the tubular member material memory return of the longitudinally extending spiral separation therein to a compression closing, thereby providing a protective roller sleeve in an installed operational disposition upon a conveyor roller without having to either remove or cut and replace the roller to accomplish the installation.

4 Claims, 2 Drawing Sheets

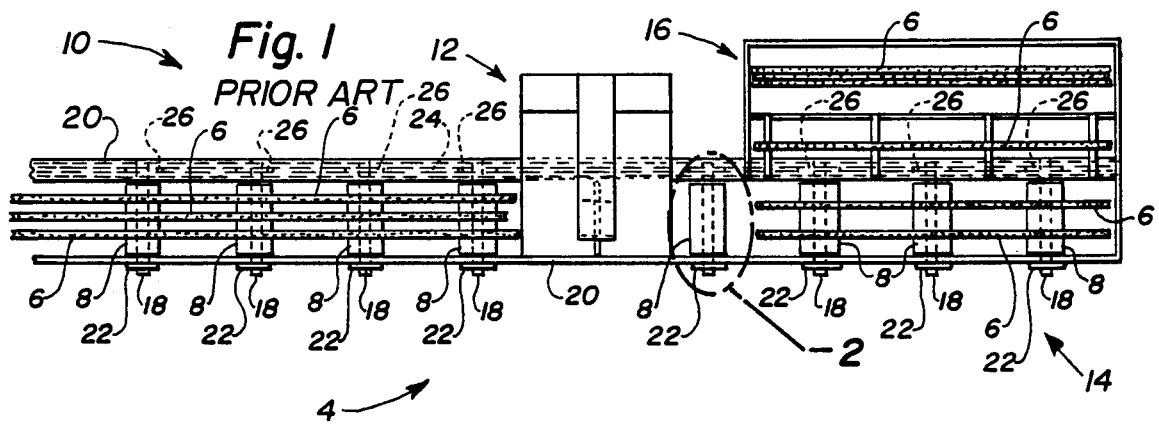

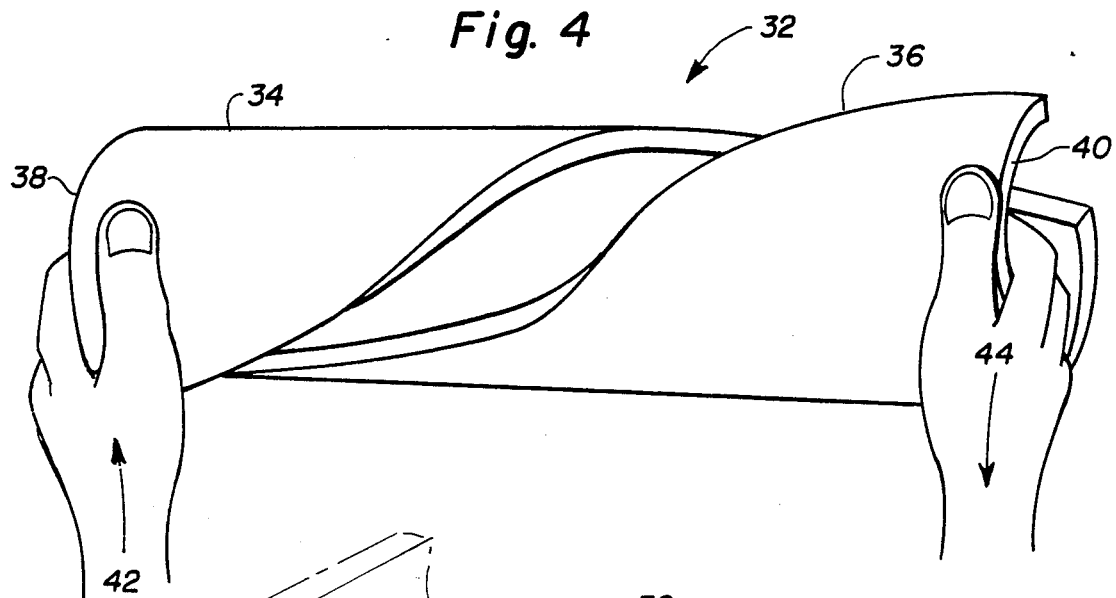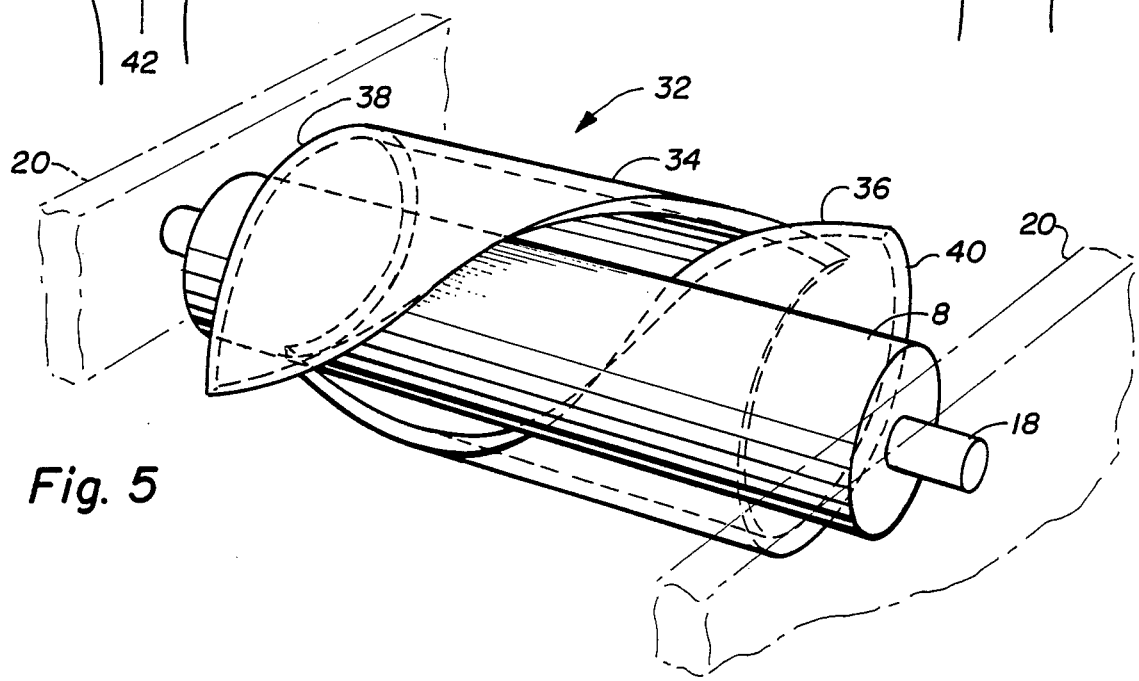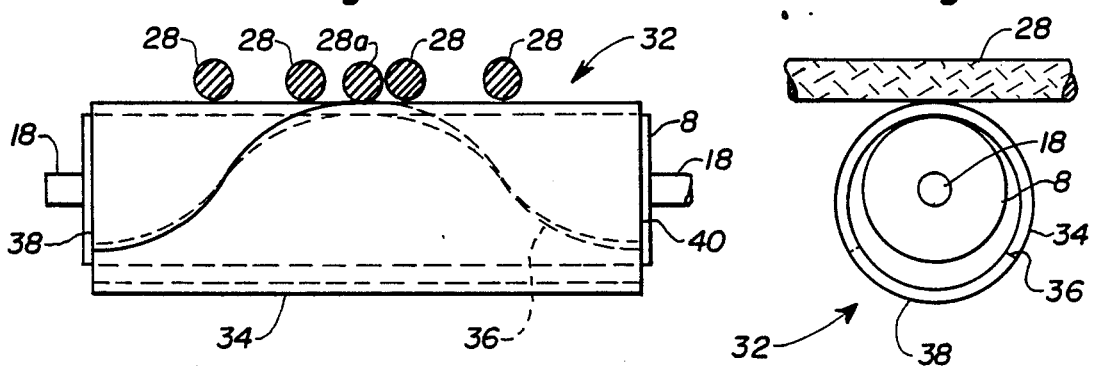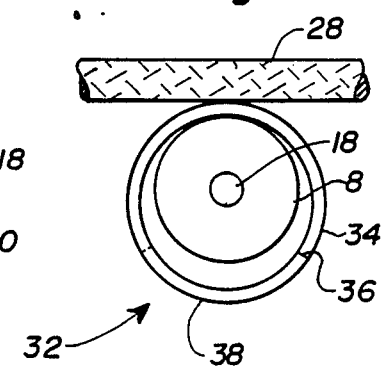

SEPARABLE ROLLER SLEEVE

BACKGROUND OF THE INVENTION

The instant invention relates to a simple, yet highly efficient and effective as well as economical, means and method for providing resilient roller sleeves, either as original or retrofit and replacement equipment, upon bare rollers of roller conveyors typically used in accomplishing the conveyancing of reinforcing bar material to and from a shear line cutting station.

Under current material handling and health and safety regulations as applied to the processing and use of concrete construction reinforcing bar, two relatively new requirements must be met. First, as a consequence of structural failures of concrete bridges and buildings erected with the use of rust-coated steel reinforcing bar, it is now necessary to prevent rust forming on the reinforcing bar by surfacing it with a protective epoxy coating which must be maintained from manufacture of the reinforcing material through handling and processing to ultimate use. Second, in the processing of reinforcing bar through a shear line in cutting it to the required lengths for a particular job, and in consideration of shear line worker health and safety, it is now also necessary to substantially reduce the otherwise very high and continuous noise levels characteristically associated with the reinforcing bar shearing line operation.

Typically, the conveyancing machinery employed in a reinforcing bar shearing line operation, for both input and output transport of reinforcing bar material to and from the cutting station, employ bare steel rollers which not only nick and damage the reinforcing bar epoxy coating during conveyancing, but also create extremely high metal-to-metal noise levels.

Functionally, one very effective means and method of overcoming both of the foregoing problems with regard to processing coated reinforcing bar through a roller conveyor shear line is to cover the conveyor rollers with a resilient sleeve as taught by Mushovic in U.S. Pat. No. 4,312,444 dated Jan. 26, 1982, thereby eliminating the bare metal impact and resultant nicking and damage caused by uncovered rollers upon the epoxy coating as aforesaid, and also reducing substantially the high operational noise levels otherwise associated with metal-to-metal contact in accomplishing reinforcing bar conveyancing through a shear line by means of bare metal rollers whether powdered or idler. In practical application, however, although the Mushovic conveyor roller would be useful in new roller conveyor construction for a shear line, because of the relatively permanent manner in which rollers and roller bearings were typically installed in roller conveyor frames of older machines it would be both expensive and difficult to replace or retrofit the bare metal rollers of older shear line conveyors with the newer rollers as taught by Mushovic.

Although structurally similar in appearance to the roller sleeve of instant invention, the roller sleeve as taught by Lounsbury, Jr., et al in U.S. Pat. No. 4,646,677 dated Mar. 3, 1987, is not only for a totally different application, but is distinguished in that it has a closed or joined spiral construction rather than the separable roller sleeve construction of instant invention.

The applicant herein by his invention provides not only new and novel means and methods for solving the problems of coating damage and excessive noise levels when conveying protectively coated reinforcing bar through a shear line operation, but provides through his separable roller sleeve an efficient and economical solution to the problem of retrofitting older shear line roller conveyor rollers with resilient roller covers, and although some of the functions and elements of the present invention have been separately disclosed in the art there has been no finding of a description therein, nor a reasonable combination thereof when put together, which shows that combination of elements resulting in the present structure and methods of making and employing a separable roller sleeve.

SUMMARY OF THE INVENTION

It is the principal object of the present invention to provide a separable roller sleeve, and method of making and installing the same, which will provide either a retrofit or replacement roller sleeve installation capability for both powered and idler rollers on typical roll conveying machines, without the need or necessity of removing or replacing each roller assembly in accomplishing either the retrofit or replacement roller sleeve installation.

It is another object of the present invention to provide both a mechanically tough yet physically resilient separable roller sleeve material whereby the bare rollers of a typical roll conveying machine, whether powered or idler, may be protected so as to substantially extend the useful lives thereof and thereby in turn substantially reduce the maintenance, repair, and replacement costs otherwise normally associated therewith when operated unprotected.

It is also an object of the present invention to provide a separable roller sleeve which will function to dampen, absorb, and substantially reduce the high noise levels otherwise associated with roller conveying of materials, and especially the conveying of metal rod and bar materials, upon unprotected bare rollers of the typical roll conveying machine.

Still another object of the present invention is to provide a separable roller sleeve which will not nick or damage protective coatings upon materials transported during conveying operations, such as the epoxy rust preventive coatings currently applied to steel reinforcing bar, so as to thereby substantially reduce the costs and inconveniences otherwise necessitated and associated with manual touch-up of damaged coating resultant when conveyancing is accomplished upon unprotected rolls of the typical roll conveying machine.

Yet another object of the present invention is to provide a simple and inexpensive separable roller sleeve, and a facilitated method for operational assembly thereof, which is adapted for accomplishment in original equipment installation, or either retrofit or replacement installation, by persons not possessed of any special mechanical skills or talent.

The foregoing, and other objects hereof, will be readily evident upon a study of the following specification and accompanying drawings comprising a part thereof.

BRIEF DESCRIPTION OF THE DRAWINGS

FIG. 1 is a simplified top plan view of a typical roller conveying machine generally of that type employed in a shear line to accomplish movement of reinforcing bar rods to and from an intermediary cutting station.

FIG. 2 is an enlarged perspective view of a typical roller generally as shown at "2" of the roll conveying machine illustrated in FIG. 1.

FIG. 3 is an enlarged side elevation view of the separable roller sleeve which comprises the instant invention.

FIG. 4 is a side elevation view of the separable roller sleeve showing the spiral through-wall separation thereof twistably opened manually.

FIG. 5 is a perspective view of the separable roller sleeve showing the same installed to cover a typical roller of a roll conveying machine but prior to the memory return of the longitudinally extending spiral through-wall separation therein to a compression closing.

FIG. 6 is a side elevation view of the separable roller sleeve operationally installed upon a typical roller of a roll conveying machine, showing the same with the longitudinally extending through-wall separation therein compression closed and loaded with exemplary reinforcing bar material for conveyancing.

FIG. 7 is an end elevation view of the separable roller sleeve as shown in FIG. 6.

DETAILED DESCRIPTION OF THE INVENTION

Referring to FIG. 1, a simplified top plan elevation view of a typical roll conveying machine 4 is shown, being generally of that type traditionally employed in a shear line to accomplish loading and movement of reinforcing bars 6 by means of rollers 8 through an infeed section 10 of said machine 4, to a cutting station 12 where said bars 6 are cut to use lengths for a particular job, and then delivered to an outfeed section 14 for deposit in an accumulator 16. As also illustrated in FIG. 1 the roller shafts 18 are typically supported in the conveyor frame 20 by means of bearings 22 and either function as idler rollers or are driven by a roller chain drive 24 which engages drive sprockets 24 respectively assembled to various of said shafts 18. Until recently, the rollers 8 were typically bare metal, usually steel, which among other things created very high noise levels during conveyancing of reinforcing bar material due to the rotating metal-to-metal impact of the bare metal roller with the ribbed reinforcing bar, and with the advent of epoxy coated reinforcing bar 28 specifically to inhibit and prevent rusting thereof the metal-to-metal impact effect as above described further caused unacceptable nicking and damage to the epoxy coating thereby necessitating an additional operation of manual touch-up.

A ready and mechanically responsive solution to remedy both the high noise levels and epoxy coated reinforcing bar nicking problems is to fit the machine 4 with rollers having a sound dampening and impact cushioning resilient covering. The problem of implementing the foregoing solution, however, in retrofitting older machines 4 with resilient coated and protected rollers, and replacing such rollers on new machines 4 when either damaged or worn out, is illustrated in FIG. 2 which shows greater detail of the relatively permanent in-frame roller installation assembly typical in a roll conveying machine 4 whether of past or present construction.

Considering now FIG. 2, which shows more specifically the nature of the mechanical problem encountered when attempting to upgrade a bare roller 8 roll conveying machine 4 to a roll conveying machine having either cushioned rollers or rollers 8 provided with resilient roller sleeves. As illustrated in FIG. 2, which is a typical representation of past and generally present roller 8 mounting methodology for installing rollers 8 within a conveyor frame 20, whether those rollers be bare metal or cushioned, the roller shaft 18 is assembled within a set of bearings 22 that are typically affixed in an aligned and spaced relationship to the opposing conveyor frame 20 members by means of spot welds 30. In order to remove a roller 8 for the purposes of slidably installing a resilient sleeve or the like thereon, or to completely replace a bare metal roller 8 with a cushioned roller, it becomes necessary to break spot welds 30 on at least one bearing 22 in order to remove and replace roller 8 with either a resilient sleeve installed thereon or with a cushioned roller, afterwhich, with the roller shaft 18 inserted, it is then necessary to reweld the removed bearing back in aligned relationship upon the conveyor frame 20. Although the foregoing procedure is mechanically feasible and can be accomplished in retrofitting an older roll conveying machine 4 with either roller sleeves or cushioned rollers to meet current operational standards for reduced noise levels and transporting epoxy coated reinforcing bar as previously described, the use of separable roller sleeve 32, as herein taught and illustrated in FIG. 3, enables the installation of a resilient sleeve upon a bare metal roller 8, or the removal and replacement thereof in a far more efficient and economical manner, with just as efficient a result in meeting both improved operational standards and service life, plus the added advantage of not having to remove and replace any of the machine 4 components.

Directing attention now to FIG. 3, which is an enlarged side elevation view of a separable roller sleeve 32, which is comprised of a relatively thick walled resilient material tubular member 34 that is provided with a longitudinally extending compression closing spiral through-wall separation 36 from one end thereof to the other.

The spiral configuration of the through-wall separation 36 is an important feature of the separable roller sleeve 32 as will hereinafter be more fully explained, at present, however, suffice it to say that the separation of the opening 36, regardless of how it is made or provided, is sufficiently narrow so that the opposing sides of the wall surfaces formed will touch against one another in close contact compressive communication as a result of the "memory" properties of that class of material from which the separable roller sleeve 32 is preferably made. The methods of providing the spiral through-wall separation 36 from one end to the other of said relatively thick walled resilient material tubular member 34 may be by one of two ways well known in the art as standard procedures. First, a template may be made and used to mark a spiral trace on the outside of a suitable section of relatively thick walled resilient material tubular member material and then the through-wall separation 36 in the form of a spiral severance is cut with a saber saw or some similar suitable cutting device. Secondly, the through-wall separation 36 may be simply formed during an injection molding of the separable roller sleeve 32.

Preferable material from which to make the separable roller sleeve 32 of instant invention is a tough yet resilient synthetic substance which is self-supporting yet pliably rigid that can be formed and cut with relative ease and has the characteristic of "memory" return from a distorted displacement to the original formed shape, exemplary of which, but not necessarily limited to, would be urethane and similar such substances.

Considering together now the views shown in FIGS. 4 and 5, which illustrate the method of installing a separable roller sleeve 32 on a roller 8. As seen in FIG. 4, the separable roller sleeve 32 is manually grasped at the opposite longitudinal ends 38 and 40 thereof and by exerting opposing hand pressure as indicated by arrows 42 and 44, the longitudinally extending compression closing spiral through-wall separation 36 is twistably opened sufficiently to allow passage of the roller 8 therethrough so said separable roller sleeve 32 may be installed thereon as shown in FIG. 5, without the disassembly or removal of any component parts from the typical roll conveying machine 4. The installed view shown in FIG. 5 also illustrates the separable roller sleeve 32 configuration prior to a "memory" return thereof to close contact of the longitudinally extending compression closing spiral through-wall separation 36.

Although not previously mentioned, the separable roller sleeve 32 inside diameter is from ⅛ to ¼-inch oversized with respect to the roller 8 outside diameter, which is clearly illustrated in FIGS. 6 and 7. The aforementioned oversizing enables a close compressive communication closing of the spiral through-wall separation 36 as also clearly illustrated in FIGS. 6 and 7, which in turn enables operational use of the installed separable roller sleeve 32 without the need or necessity for any additional or auxiliary closing or securement means therefor.

Also as shown in FIG. 6, when the installed separable roller sleeve 32 is put to use and loaded up with epoxy coated reinforcement bar 28 for conveyancing, only one such bar at a time makes conveyancing contact with the spiral through-wall separation 36, in this case being bar 28a, therefore, there is no excessively heavy load placed upon the separation 36 during operational use.

Although the separable roller sleeve invention hereof, the structural characteristics and method of employment thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

I claim:

1. In combination with a typical roll conveying machine having a plurality of conveyor rollers, a separable roller sleeve adapted to be twistably opened and oriented manually for enclosable installation upon a bare conveyor roller of said typical roll conveying machine said separable roller sleeve comprising, a relatively thick walled resilient tubular member of uniform construction throughout having a length with opposite longitudinal ends and an interior cross-sectional diameter closely complementary but oversize to that of said bare conveyor roller by such an amount so as to provide a mechanically loose fitting disposition therebetween, and an unimpeded longitudinally extending compression closing spiral through-wall separation extending from one longitudinal end to the opposite longitudinal end thereof.

2. A separable roller sleeve according to claim 1 in which the inside dimension of said cross-sectional diameter thereof closely complementary to that of said bare conveyor roller is within a range of from ⅛-inch to ¼-inch oversize in relationship to the outside diameter of said conveyor roller.

3. A separable roller sleeve according to claim 1 in which said relatively thick walled resilient material tubular member is urethane.

4. A method of installing a separable roller sleeve upon a bare conveyor roller of a typical roll conveying machine, comprising the steps of manually grasping the opposite longitudinal ends of a relatively thick walled resilient material tubular member comprising the body thereof, manually applying opposing hand pressure to said opposite longitudinal ends of said separable roller sleeve to manually effect an extended opening of a longitudinally extending compression closing spiral through-wall separation in said relatively thick walled resilient material tubular member and manually orienting said extended opening to enclosably receive therethrough said bare conveyor roller, manually installing said separable roller sleeve upon said bare conveyor roller, and manually releasing the opposite longitudinal ends of said separable roller sleeve thereby allowing the opposing faces of said compression closing spiral through-wall separation to close and touch against one another in close contact compressive communication to dispose in self-supporting assembly thereof said separable roller sleeve upon said bare conveyor roller.

* * * * *